(12) United States Patent
Ryon

(10) Patent No.: US 10,659,490 B1
(45) Date of Patent: May 19, 2020

(54) INDEPENDENT AND DISSIMILAR CYBERSECURITY MONITORING OF CRITICAL CONTROL SYSTEMS

(71) Applicant: Rockwell Collins, Inc., Cedar Rapids, IA (US)

(72) Inventor: Luke E. Ryon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 316 days.

(21) Appl. No.: 15/624,233

(22) Filed: Jun. 15, 2017

(51) Int. Cl.
*H04L 29/06* (2006.01)
*G05B 23/02* (2006.01)
*G06F 21/55* (2013.01)
*G06N 20/00* (2019.01)
*G05B 15/02* (2006.01)

(52) U.S. Cl.
CPC ...... *H04L 63/1441* (2013.01); *G05B 23/0229* (2013.01); *G05B 23/0235* (2013.01); *G06F 21/552* (2013.01); *G06N 20/00* (2019.01); *H04L 63/1416* (2013.01); *H04L 63/1425* (2013.01); *G05B 15/02* (2013.01)

(58) Field of Classification Search
CPC ............. H04L 63/1441; H04L 63/1425; H04L 63/1416; G06F 21/552; G05B 23/0243; G05B 23/0254; G05B 23/0229
See application file for complete search history.

(56) References Cited

U.S. PATENT DOCUMENTS 9,369,484 B1 6/2016 Lacerte et al.

*Primary Examiner* — Paul E Callahan
(74) *Attorney, Agent, or Firm* — Suiter Swantz pc llo

(57) ABSTRACT

Systems and related methods for independent dissimilar cybersecurity monitoring of avionics and other critical control systems (CCS) incorporate security monitors with dissimilar processors to the CCS. The security monitors learn, using AI techniques, to emulate one or more target CCS by learning to predict, or generate, equivalent outputs or equivalent behaviors based on the same control inputs. The security monitors may monitor the CCS, or its individual internal and external subsystems, for cybersecurity faults by observing the control behaviors or outputs of the CCS for a given control input or comparing the control behaviors or outputs to expected normal behaviors and outputs previously learned by the security monitor. Deviance, or lack of equivalence, of observed control behaviors or outputs to the expected normal behaviors or outputs may indicate a cyber-intrusion fault of the CCS or of a particular subsystem.

20 Claims, 9 Drawing Sheets

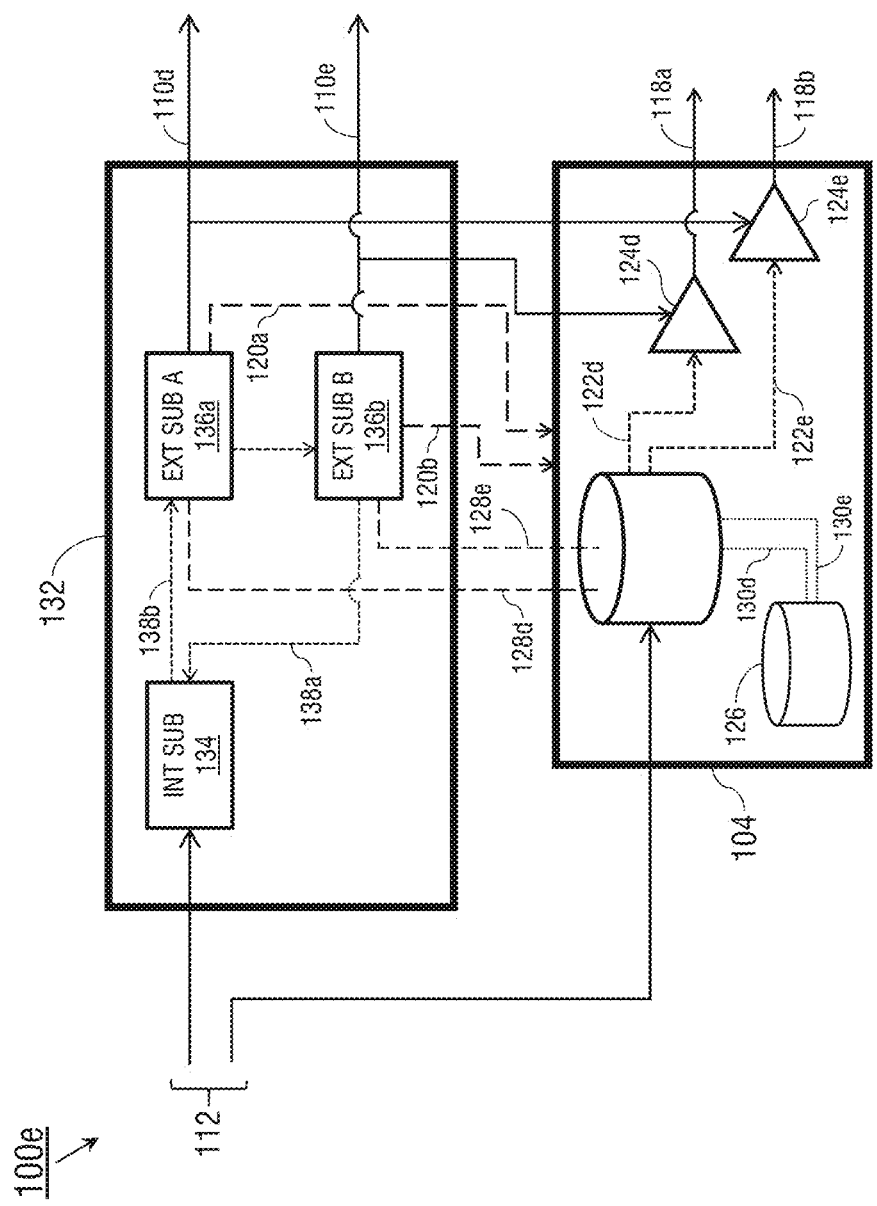

200

210 — Observing, via the at least one AI engine, one or more control behaviors of associated with the at least one CCS in response to the at least one received control input 212 — Determining, via the at least one AI engine, the at least one stored test input corresponding to the at least one received control input

INDEPENDENT AND DISSIMILAR CYBERSECURITY MONITORING OF CRITICAL CONTROL SYSTEMS

BACKGROUND

Unsafe conditions may occur when an onboard flight control system or similar critical control system is impacted by a cyberintrusion. This impact may be reduced, and unsafe conditions prevented, by detecting the intrusion and performing appropriate countermeasures. For example, a cyberintrusion may be detected by independent dissimilar monitoring of critical control systems. A simplified model of the control system may be created and implemented into an intrusion detection system. Alternatively, the control system may be independently implemented to create a dissimilar, but equivalent, monitoring system. However, both of these approaches may significantly drain available resources.

SUMMARY

In one aspect, embodiments of the inventive concepts disclosed herein are directed to an artificial intelligence (AI)-based system for independent and dissimilar cybersecurity monitoring of avionics systems or other similar critical control systems (CCS). The system includes an AI engine capable of learning to emulate the CCS to be monitored, where the processors comprising the CCS are dissimilar to those comprising the AI engine. The AI engine may learn to emulate the CCS by receiving a series of test inputs or input vectors from a testing knowledge base and learning to predict, or generate, test outputs equivalent to the outputs generated by the CCS based on the same test inputs. Once trained, the AI engine may be connected to the CCS, receiving the same control inputs as does the CCS. The AI engine may predict or generate its own test outputs based on the received control inputs or input vectors, while receiving the actual control outputs generated by the CCS. By comparing the predicted or generated test outputs to the actual control outputs generated by the CCS (e.g., via one or more comparators), the AI engine may detect cyberintrusion faults in the CCS based on deviance, or lack of equivalence, of the control outputs.

In a further aspect, embodiments of the inventive concepts disclosed herein are directed to a system for independent and dissimilar cybersecurity monitoring of CCS without the use of comparators. The system includes an AI engine capable of learning to emulate one or more CCS (comprising processors dissimilar to those comprising the AI engine) by receiving test inputs from a knowledge base and determining, based on each received test input, expected normal behaviors of the CCS based on the test input. The AI engine stores each test input, along with the associated expected normal behaviors, to the knowledge base. Once trained, the AI engine and knowledge base may be connected to the CCS. The AI engine may receive control inputs also received by the CCS and observe any control behaviors of the CCS resulting from each control input. The AI engine may determine the corresponding test input for each observed control behavior and determine (from the knowledge base) the expected normal behaviors of the CCS associated with the determined test input. The AI engine may detect cyberintrusion faults (internal or external) in the CCS by comparing the observed control behaviors to the expected normal behaviors. If the control behaviors deviate from, or lack equivalence to, the associated expected normal behaviors, a cyberintrusion fault may be indicated.

In a still further aspect, embodiments of the inventive concepts disclosed herein are directed to a method for independent and dissimilar cybersecurity monitoring of critical control systems. The method may include teaching an AI engine to emulate one or more CCS (incorporating processors dissimilar to those incorporated by the AI engine) based on one or more test inputs. The method may include connecting the trained AI to the CCS. The method may include receiving, via the trained AI engine, control inputs also received by the CCS. The method may include detecting, via the trained AI engine, cyberintrusion faults within the CCS (either internal or external) based on the received control inputs.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 5A, 5B, and 5C are diagrammatic illustrations of the systems of FIG. 1 and FIG. 3, configured for monitoring of a system of systems.

DETAILED DESCRIPTION OF EXEMPLARY EMBODIMENTS

Figure 1:
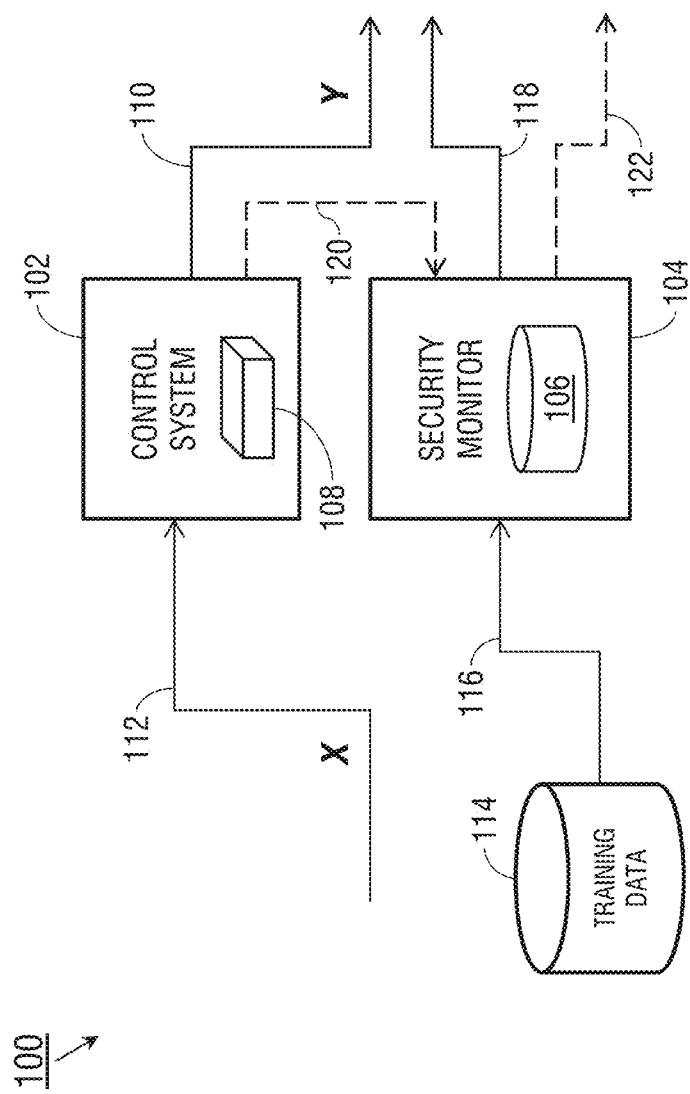
FIG. 1 is a diagrammatic illustration of an exemplary embodiment of a system for independent and dissimilar cybersecurity monitoring according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and related methods for independent and dissimilar cybersecurity monitoring of avionics systems and other similar critical control systems (CCS). AI-based monitor systems according to the inventive concepts disclosed herein may eliminate the need for complex and costly redundant systems, as the systems need only learn to emulate their target CCS. Similarly, the monitor systems need not achieve the same design assurance or provide the full features of their target systems.

Referring to FIG. 1, an exemplary embodiment of a system 100 for independent and dissimilar cybersecurity monitoring of a critical control system 102 (CCS) includes an artificial intelligence (AI)-based security monitor 104. The CCS 102 may include a flight control system embodied aboard an aircraft, or any like control system (e.g., required to ensure safe flight and landing) potentially vulnerable to cyberintrusion. For example, the CCS 102 may be infected with malware or may receive malicious input data, e.g., buffer overflow. In either case the cyberintrusion may affect the behavior of the CCS 102 or the normal outputs generated in response to system control inputs. The security monitor 104 may incorporate dissimilar processors (106) (e.g., AI engines) to the processors (108) comprising the CCS 102. For example, if the CCS 102 comprises Intel-based processors (108), the security monitor 104 may comprise ARM-based processors (106) or other like hardware distinct from the processors 108 or executing distinct software from that executing on the processors 108 (e.g., a dissimilar guest operating system (GOS)). The dissimilar processors 106 of the security monitor 104 may thus not be susceptible to the same cyberintrusions or attacks as the CCS 102.

The security monitor 104 may be an independent monitor and therefore may be implemented independent of the design assurance requirements, precision requirements, or full features of the CCS 102. The security monitor 104 may be trained, or may learn, to emulate the CCS 102 using AI techniques, learning in one or more of a supervised, unsupervised, or reinforcement-based fashion. For example, the CCS 102 may generate a control output Y (110) in response to a given control input X (112). The AI learning process may provide a large knowledge base of training data (114), including test inputs 116 and corresponding desired outputs 118 (e.g., cyberintrusion detected/no intrusion detected). The training data 114 may be generated by obtaining the CCS control inputs 112 and corresponding control outputs 110 (or, e.g., input vectors 120 corresponding to CCS control inputs and the associated control outputs) and noting the desired output 118 for these particular input vectors as "no intrusion" (e.g., given a particular control input 112, the corresponding control output 110 should be expected under normal operations). The training data 114 may include additional, anomalous input vectors having a corresponding desired output (118) of "no intrusion"; these anomalous input vectors may be tested against the CCS 102 to ensure their abnormality. An AI engine (106) trained in such a manner may be able to predict a desired output (118), e.g., intrusion/no intrusion, corresponding to a given control input vector 120 (e.g., a CCS control input 112 and corresponding control output 110) regardless of whether or not a particular input vector 120 was included or accounted for in the knowledge base 114 of training data.

In some embodiments, the security monitor 104 may, rather than comparing control inputs 112 and control outputs 110 of the CCS 102, identify a cluster of normal behaviors of the CCS 102 via unsupervised learning. For example, the AI engine 106 may be trained by running clustering algorithms on the knowledge base 114 of training data, the training data set including only normal behaviors of the CCS 102 as determined by observing the behavior of the CCS. The AI engine 106 trained via unsupervised learning may predict the normal behaviors of the CCS 102 based on the clustered training data (114) and detect a cyberintrusion of the CCS 102 based on data outside the cluster.

In some embodiments, the AI engines 106 of the security monitor 104 may be trained via reinforcement learning. For example, the AI engine 106 may be configured to execute a reward function associated with accurate prediction of a CCS control output 110 based on a given CCS control input 112. The AI engine 106 may be trained via the reward function to generate test outputs (122) equivalent to the CCS control outputs 110 based on test inputs (116) consisting of CCS control inputs (112) provided to the AI engine for training purposes.

Figure 2A:
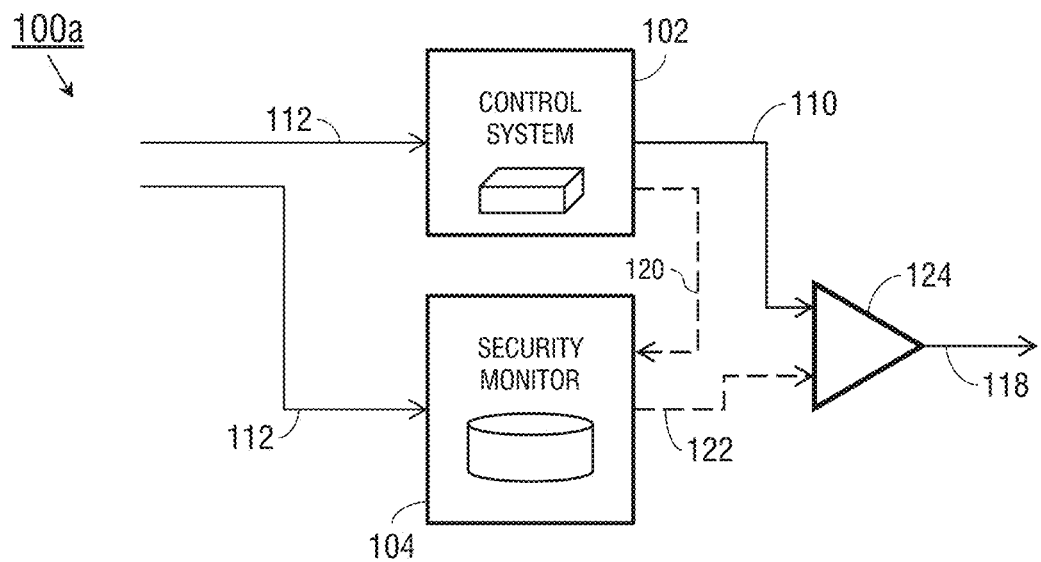
FIGS. 2A and 2B are diagrammatic illustrations of operations of the system of FIG. 1.
Figure 2B:
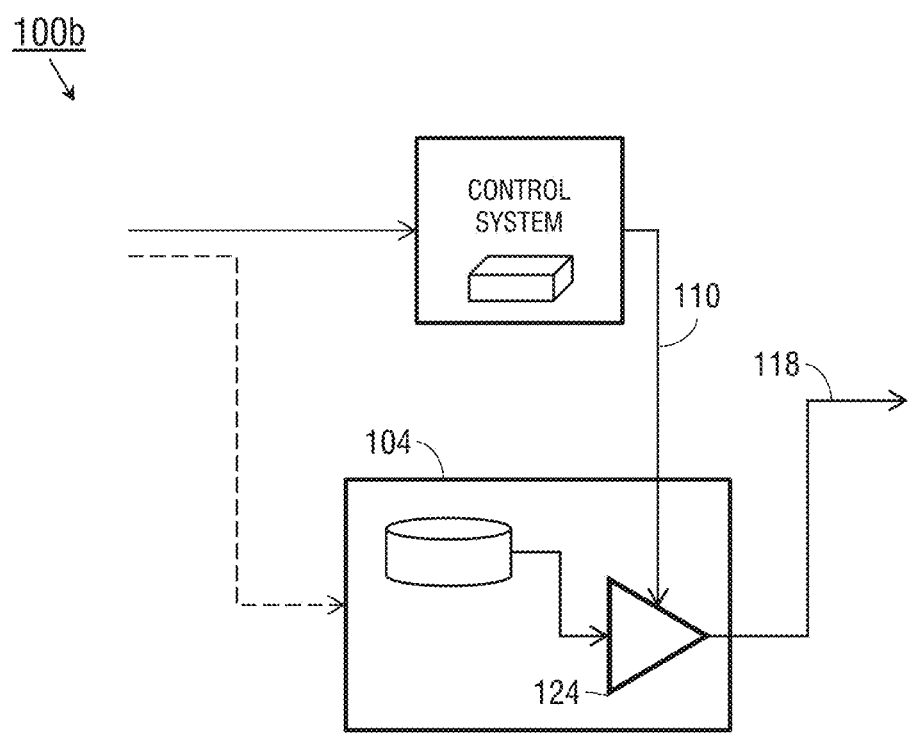

Referring now to FIG. 2A, the system 100a may be implemented and may function similarly to the system 100 of FIG. 1, except that the system 100a may be embodied aboard an aircraft or similar vehicle and may include comparators (124) and a trained security monitor (104) configured for receiving the same control inputs (112) received by the CCS 102 (which the security monitor 104 has been trained to emulate). In some embodiments, the security monitor 104 may generate a desired output 118 based on analysis of received control input vectors (120) incorporating both control inputs 112 and corresponding control outputs 110, without the use of comparators 124. While the CCS 102 generates a control output (110) based on each received control input 112, the security monitor 104 may generate a test output (122) based on the received control input 112. The comparators 124 may determine the presence of a cyberintrusion fault by comparing the control outputs 110 generated by the CCS 102 with the test outputs 122 generated by the security monitor 104 to generate a desired output 118 (e.g., no intrusion/intrusion). Any deviation or lack of equivalence between the control outputs 110 and the test outputs 122 may indicate a cyberintrusion fault. For example, the CCS 102 may be previously compromised by malware, which may alter a portion of the CCS code. The compromised CCS 102 may, at a later point, launch an active attack (e.g., a logic bomb or control message transmitted to the malware) against the CCS itself or against a larger avionics system or network of which the CCS 102 is a component or node. Alternatively, the CCS 102 may be the recipient of malicious data (e.g., buffer overflow), causing the execution of malicious code or crashing one or more applications of the CCS 102. In either case, the comparators 124 may determine that the control output of the compromised CCS 102 deviates from the expected control output (110), indicating a likely cyberintrusion (desired output 118). Referring now to FIG. 2B, the system 100b may be implemented and may function similarly to the system 100a of FIG. 2A, except that the comparators 124 may be co-located with the security monitor 104.

Figure 3:
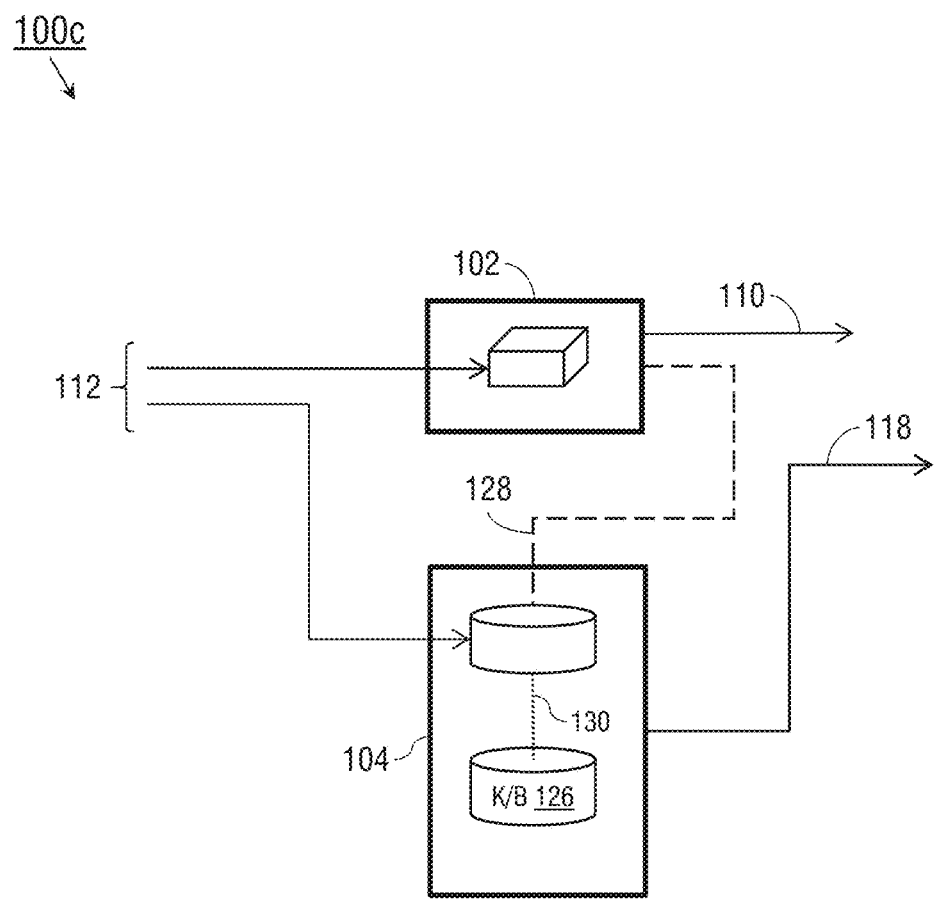
FIG. 3 is a diagrammatic illustration of an exemplary embodiment of a system for independent and dissimilar cybersecurity monitoring according to the inventive concepts disclosed herein.

Referring to FIG. 3, the system 100c may be implemented and may function similarly to the system 100a of FIG. 2A, except that the system 100c may include a security monitor (104) incorporating an onboard knowledge base (126). As opposed to generating a test output (122, FIG. 2A) against which the control outputs 110 or input vectors (120, FIG. 1) may be compared for equivalence (e.g., by comparators 124, FIG. 2A), the security monitor 104 may be trained, or may learn, to directly predict the expected normal behaviors of the CCS 102, e.g., in response to a given test input (116, FIG. 1) or input vector 120. The security monitor 104 may store each test input 116 or input vector 120, along with the test behaviors associated with that test input or input vector (and corresponding to expected normal behaviors in response to the test input/input vector), to the onboard knowledge base 126. The security monitor 104 may eliminate the need for comparators 124 by directly observing (128) the control behaviors of the CCS 102 in response to a given control input 112 or input vector 120. At the same time, the security monitor 104 may determine the equivalent test input 116 (stored in the onboard knowledge base 126) to the observed control behaviors (128), as well as any expected normal behaviors (130) associated with the stored test input 116. If the observed control outputs and behaviors (128) of the CCS 102 deviate from the expected normal behaviors 130 stored in the onboard knowledge base 126, the security monitor 104 may indicate detection of a cyberintrusion (desired output 118).

Figure 4:
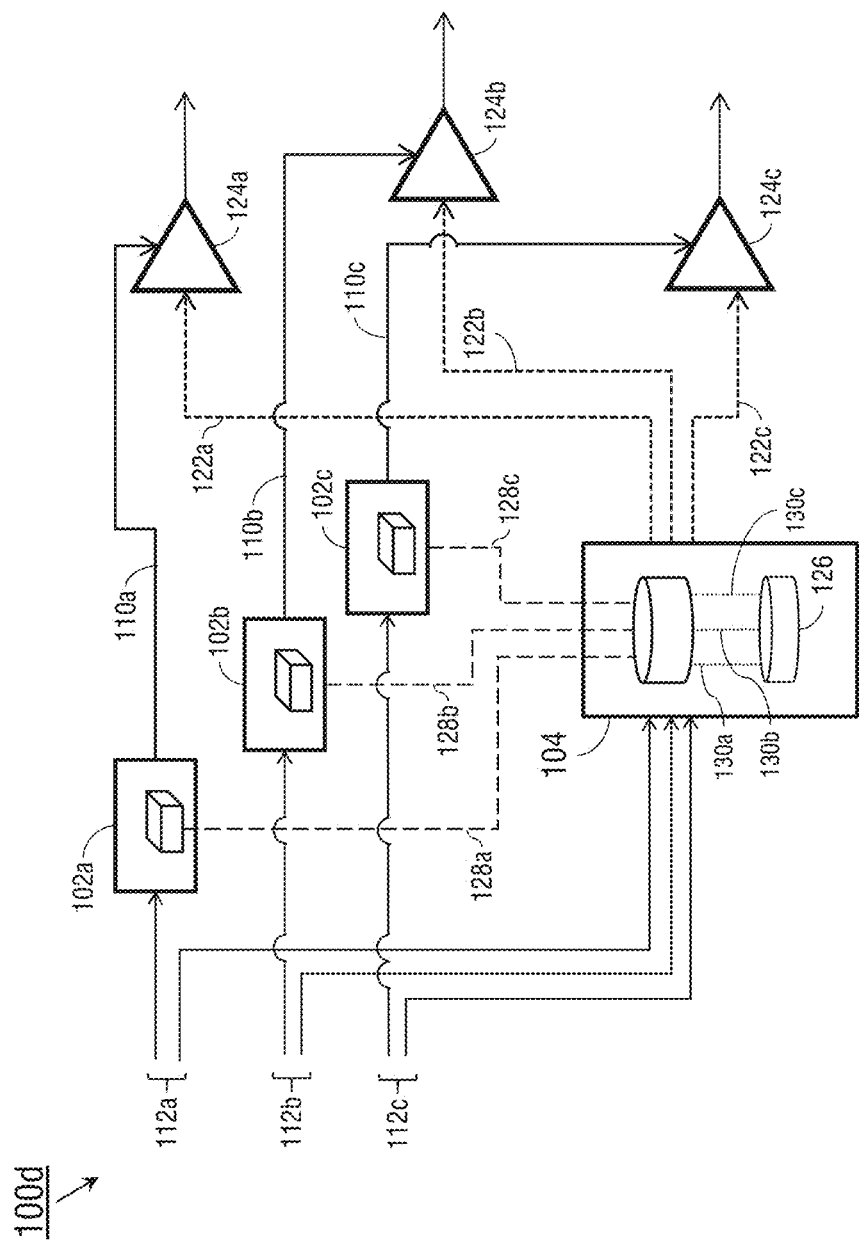
FIG. 4 is a diagrammatic illustration of the system of FIG. 1 configured for monitoring of multiple critical control systems.

Referring to FIG. 4, the system 100d may be implemented and may function similarly to the system 100a of FIG. 2A or the system 100c of FIG. 3, except that the system 100d may be configured to monitor multiple CCSs 102a-c. For example, the system 100d may include multiple comparators 124a-c, each comparator configured to compare for equivalence the control outputs 110a-c of each CCS 102a-c (or, alternatively, input vectors 120 (FIG. 2A) with the test outputs 122a-c generated by the security monitor 104 based on the CCS control inputs (112a-c). Alternatively, the security monitor 104 may directly observe the control behaviors (128a-c) of each respective CCS 102a-c based on the appropriate control inputs (112a-c) and thereby refer to the onboard knowledge base 126 to determine if the observed control outputs and behaviors 128a-c align with the stored expected normal behaviors (130a-c) associated with the stored test input (116, FIG. 1) corresponding to the control inputs 112a-c.

Referring to FIG. 5A, the system 100e may be implemented and may function similarly to the system 100d of FIG. 4, except that in place of the CCS (102, FIG. 4) may be a system of systems (132) comprising a network of interconnected internal control subsystems 134 and external control subsystems 136a-b. For example, the internal control subsystem 134 may receive one or more of the control input 112 as well as internal control outputs (138a) generated by other internal or external control subsystems (e.g., external control subsystem 136b), generating an internal control output 138b received by the external control subsystem 136a. The external control subsystems 136a-b may generate external control outputs 110d-e, which may be equivalent to control outputs of the system of systems 132. The security monitor 104 may be trained (or may learn) using AI techniques to receive each control input 112 and predict, or generate, test outputs 122d-e, accounting for any intermediary internal control subsystems 134 and internal control outputs 138a-b. The generated test outputs 122d-e may be compared for equivalence (e.g., by comparators 124d-e) to the generated external control outputs 110d-e (or, alternatively, input vectors 120a-b). If either external control output 110d-e or control input vector 120a-b deviates from, or lacks equivalency to, its corresponding test output 122d-e, a cyberintrusion may be indicated (118a-b) by the security monitor 104. Alternatively, the security monitor 104 may detect a cyberintrusion (118a-b) by directly observing the external control behaviors (128d-e) of the system of systems 132 in comparison to the expected normal behaviors 130d-e (stored in the onboard knowledge base 126) associated with the test input (116, FIG. 1) corresponding to each control input 112 or control input vector 120a-b.

Figure 5B:
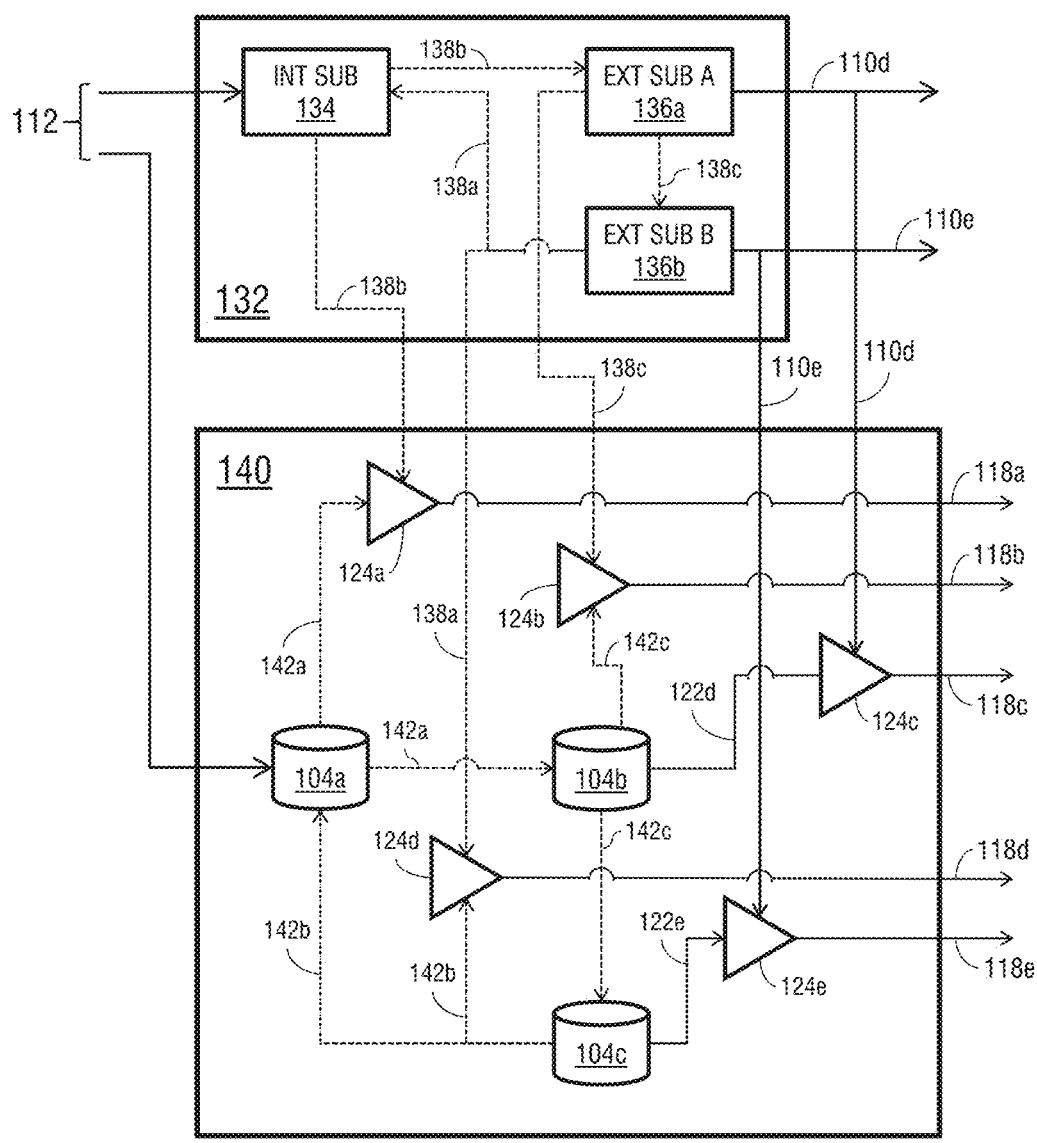

Referring to FIG. 5B, the system 100f may be implemented and may function similarly to the system 100e of FIG. 5A, except that the system 100f may comprise a collection (140) of interconnected and intercommunicating individual security monitors 104a-c (e.g., dissimilar AI engines). Each individual security monitor (104a-c) may respectively learn, using AI techniques as described above, to emulate a particular corresponding internal control subsystem 134 or external control subsystem 136a-b of the system of systems 132.

For example, the security monitor 104a may emulate the internal control subsystem 134 by predicting or generating a test internal control output (142a) for comparison (e.g., via the comparator 124a) to the internal control output 138b generated by the internal control subsystem 134, based on the received control input 112 (or, alternatively, control input vector 120a-b (FIG. 5A) and a test internal control output (142b) generated by the security monitor 104c (e.g., as a simulation of the internal control output 138a generated by the external control subsystem 136b and received by the internal control subsystem 134). If the internal control output 138b is not equivalent to the test internal control output 142a, the comparator 124a may indicate a cyberintrusion fault (118a) specific to the internal control subsystem 134.

Similarly, the security monitor 104b may emulate the external control subsystem 136a by generating a test internal control output (142c) for comparison (e.g., via the comparator 124b) to the internal control output 138c (or, alternatively, control input vector 120a-b) generated by the external control subsystem 136a. If the internal control output 138c deviates from the test internal control output 142c, the comparator 124b may indicate a cyberintrusion fault 118b specific to the external control subsystem 136a. Similarly, the security monitor 104b may generate a test external control output 122d for comparison to the external control output 110d of the external control subsystem 136a; if the external control output 110d deviates from the test external control output 122d, the comparator 124c may indicate a cyberintrusion fault 118c specific to the external control subsystem 136a.

Further, the security monitor 104c may emulate the external control subsystem 136b by generating the test internal control output 142b (for comparison with the internal control output 138a via the comparator 124d) as well as a test external control output 122e (for comparison with the external control output 110e (or, alternatively, control input vector 120a-b) via the comparator 124e). If the internal control output 138a deviates from the test internal control output 142b, or the external control output 110e deviates from the test external control output 122e, the respective comparators 124d-e may indicate a cyberintrusion fault (118d-e) specific to the external control subsystem 136b. In some embodiments, the collection 140 of security monitors 104a-c may directly monitor the system of systems 132 and its respective internal control subsystems 134 and external control subsystems 136a-b without the need for individual comparators 124a-e or their respective output signals (cyberintrusion faults 118a-e).

Figure 5C:
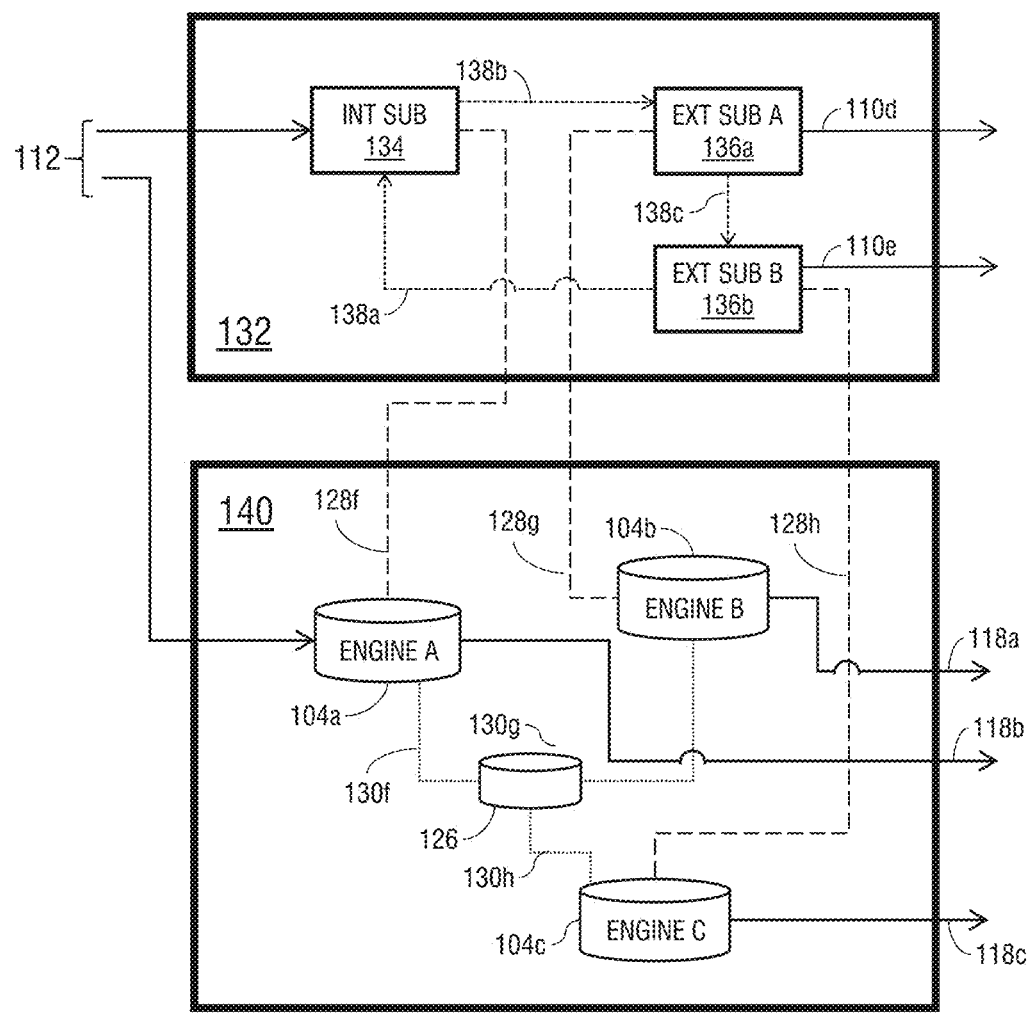

Referring now to FIG. 5C, the system 100g may be implemented and may function similarly to the system 100f of FIG. 5B, except that the system 100g may include a collection (140) of individual security monitors 104a-c capable of directly detecting subsystem-specific cyberintrusions (118a-c) without the need for comparators (124a-e, FIG. 5B). For example, the security monitor 104a (e.g., AI engine) may be trained or may learn, using AI techniques, expected normal behaviors (130f) of the internal control subsystem 134 based on a series of possible test inputs (116, FIG. 1) or control input vectors (120, FIG. 1). The expected normal behaviors (130f) may be stored by the security monitor 104a, along with the associated test inputs, to the onboard knowledge base 126. Similarly, the security monitors 104b-c may learn the characteristic normal behaviors (130g-h) of the respective external control subsystems 136a-b, storing the expected normal behaviors 130g-h to the onboard knowledge base. When the collection (140) of trained security monitors 104a-c is connected to the system of systems 132, each security monitor 104a-c may directly observe the control behaviors 128f-h in response to control inputs 112 or control input vectors 120 (as well as internal control outputs 138a-c received by internal control subsystem 134 and external control subsystems 136a-b). The security monitors may determine a counterpart test input (116, FIG. 1) for each control input 112 and compare the observed control behaviors 128f-h to the expected normal behaviors 130f-h associated with each counterpart test input 116 and stored in the onboard knowledge base 126. If any set of control behaviors 128f-h deviates from its counterpart set of expected normal behaviors 130f-h, the respective security monitor 104a-c may indicate a cyberintrusion fault specific to the internal control subsystem 134 or external control subsystem 136a-b emulated by that security monitor.

Figure 6A:
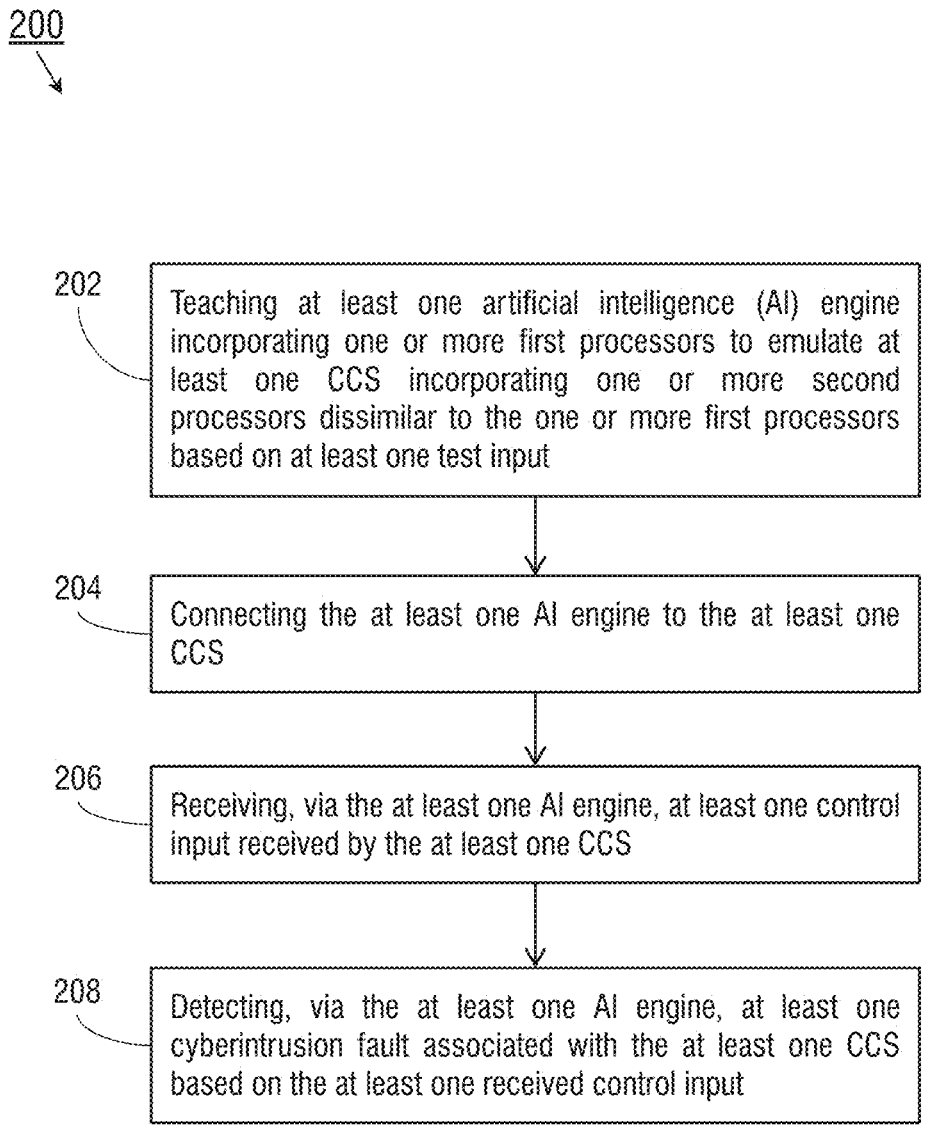
FIGS. 6A and 6B are process flow diagrams illustrating an exemplary embodiment of a method according to the inventive concepts disclosed herein.
Figures 6A, 6B:

Referring to FIGS. 6A-B, an exemplary embodiment of a method 200 for independent and dissimilar cybersecurity monitoring according to the inventive concepts disclosed herein may be implemented by the system 100 in some embodiments, and may include one or more of the following steps. Referring particularly to FIG. 6A, at a step 202 a security monitor (e.g., dissimilar AI engine) is taught, using AI techniques, to emulate critical control systems (CCS) based on test inputs. For example, the security monitor may learn to predict, based on test inputs or input vectors (e.g., control inputs of the CCS and the corresponding control outputs), control outputs generated by the target CCS based on received control inputs. The security monitor may learn to generate test outputs based on the received test inputs or input vectors, in order to simulate the equivalent control outputs generated in response to the received control inputs. The security monitor may learn to emulate the CCS by observing normal behaviors of the CCS in response to a variety of test inputs.

At a step 204, the security monitor is connected to the CCS it has learned to emulate.

At a step 206, the security monitor receives control inputs also received by the CCS.

At a step 208, the security monitor detects a cyberintrusion fault of the CCS based on the received control input. For example, the security monitor may detect a cyberintrusion fault of the CCS or, if the CCS is a system of systems incorporating internal and external outputs, the security monitor may determine external faults of the system of systems as a whole. Alternatively, the security monitor may include a collection of interconnected AI engines, each individual AI engine trained to emulate a particular subsystem of the system of systems and detect a cyberintrusion fault specific to its subsystem by emulating the inputs and outputs of that subsystem. The security monitor may detect a cyberintrusion fault by predicting the expected control output for a given control input; by comparing the expected control output, or a test output generated by the security monitor in response to the given control input, to the actual control output, the security monitor may indicate a cyberintrusion fault if the expected control output (or the generated test output) is not equivalent to, or deviates from, the actual control output. The security monitor may detect a cyberintrusion fault by comparing observed behaviors of the CCS, and the corresponding test inputs, to the normal behaviors of the CCS in response to those test inputs, indicating a cyberintrusion fault if the observed behaviors deviate from normal behaviors.

Referring now to FIG. 6B, the method 200 may include additional steps 210 and 212. At the step 210, the security monitor observes control behaviors of the CCS based on the received control inputs.

At the step 212, the security monitor determines the stored test inputs corresponding to observed control behaviors of the CCS.

As will be appreciated from the above, systems and methods according to embodiments of the inventive concepts disclosed herein may provide multiple forms of cyberintrusion detection without the need for complex redundant systems. In addition, dissimilar and independent monitors according to the inventive concepts disclosed herein would not require extensive subject matter expertise or system development, as the monitors need only learn to emulate their target control systems. Similarly, cyberintrusion monitors would not need to achieve the same design assurance requirements or implementation precision, or incorporate the full features of their target systems.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A system for independent and dissimilar cybersecurity monitoring of critical control systems (CCS), comprising:
   at least one memory configured for storing a knowledge base comprising at least one of a test input and a first input vector, the first input vector including at least one of a first control input associated with a CCS incorporating one or more first processors and a first control output corresponding to the first control input;
   at least one artificial intelligence (AI) engine incorporating one or more second processors dissimilar to the one or more first processors, the AI engine coupled to the at least one memory and capable of learning to emulate the at least one CCS by:
      receiving at least one of the test input and the first input vector from the knowledge base;
      and
      learning to predict one or more first test outputs associated with at least one of the test input and the first input vector, the one or more first test outputs corresponding to the at least one first control output generated by the at least one CCS based on one or more of the test input and the first control input;
   the at least one AI engine couplable to the at least one CCS and configured to:
      receive from the at least one CCS at least one of a second control input and a second input vector, the second control input received by the at least one CCS and the second input vector associated with at least one of the second control input and a second control output corresponding to the second control input;
      and
      detect at least one cyberintrusion fault associated with the at least one CCS based on one or more of the at least one second control input, the at least one second input vector, and the one or more first test outputs.

2. The system of claim 1, wherein the at least one CCS includes at least one aircraft-based flight control system.

3. The system of claim 1, wherein the at least one AI engine is configured to generate one or more second test outputs based on at least one of the second control input and the second input vector, further comprising:
   at least one comparator coupled to the at least one CCS and to the AI engine, the at least one comparator configured to:
      receive from the at least one AI engine the one or more second test outputs;
      receive from the at least one CCS one or more of the second control output and the second input vector;
      and
      detect the at least one cyberintrusion fault by comparing the one or more second control outputs to the one or more second test outputs.

4. The system of claim 1, wherein the at least one second control output is at least one of an internal control output and an external control output, and:
   the at least one CCS includes one or more of an internal control subsystem and an external control subsystem, the at least one internal control subsystem configured to generate the at least one internal control output received by one or more of the internal control subsystem and the external control subsystem and the at least one external control subsystem configured to generate the one or more external control outputs.

5. The system of claim 4, wherein:
   the at least one cyberintrusion fault is associated with one or more of the at least one CCS and the at least one external control subsystem.

6. The system of claim 4, wherein the at least one AI engine is a first AI engine and the at least one cyberintrusion fault is a first cyberintrusion fault, further comprising:
   at least one second AI engine capable of learning to emulate the at least one internal control subsystem by learning to predict at least one third test output based on at least one of the first test input and the first input vector, the at least one third test output corresponding to at least one internal control output;
   the at least one second AI engine configured to detect at least one second cyberintrusion fault associated with the at least one internal control subsystem based on at least one of the second control input, the second input vector, and the third test output.

7. The system of claim 6, wherein the at least one second AI engine is configured to generate the at least one third test output based on at least one of the second control input and the second input vector, further comprising:
   at least one second comparator coupled to the at least one second AI engine and to the at least one internal control subsystem, the at least one second comparator configured to:
      receive from the at least one second AI engine the at least one third test output;
      receive from the at least one internal control subsystem at least one of the second control output and the second input vector; and
      detect the at least one second cyberintrusion fault by comparing at least one of the second control output and the second input vector to the at least one third test output.

8. A system for independent and dissimilar cybersecurity monitoring of critical control systems (CCS), comprising:
   at least one memory configured for storing a knowledge base comprising at least one test input associated with a CCS incorporating at least one first processor;
   at least one artificial intelligence (AI) engine incorporating at least one second processor dissimilar to the first processor, the AI engine coupled to the at least one memory and capable of learning to emulate at least one CCS by:
      receiving at least one test input from the knowledge base;
      learning to predict at least one normal behavior of the at least one CCS by observing at least one test behavior associated with the at least one CCS and generated by the at least one CCS in response to the at least one test input;

and
storing one or more of the at least one test input and the associated normal behavior to the knowledge base;

the AI engine couplable to the at least one CCS and configured to:
receive at least one control input received by the at least one CCS;
observe one or more control behaviors associated with the at least one CCS in response to the at least one received control input;
determine the at least one stored test input corresponding to the at least one received control input;
and
detect at least one cyberintrusion fault associated with the at least one CCS by comparing the one or more observed control behaviors to the at least one stored normal behavior associated with the at least one determined test input.

9. The system of claim 8, wherein the at least one CCS includes at least one aircraft-based flight control system.

10. The system of claim 8, wherein the one or more control behaviors are first control behaviors, and:
the at least one CCS includes one or more of an internal control subsystem and an external control subsystem, the internal control subsystem associated with at least one second control behavior in response to the at least one received control input, the one or more first control behaviors in response to one or more of the at least one received control input and the at least one second control behavior.

11. The system of claim 10, wherein the at least one cyberintrusion fault is associated with one or more of the at least one CCS and the at least one external control subsystem.

12. The system of claim 10, wherein the at least one AI engine is a first AI engine, the at least one test behavior is a first test behavior, the at least one control behavior is a first control behavior, the at least one normal behavior is a first normal behavior, and the at least one cyberintrusion fault is a first cyberintrusion fault, further comprising:
at least one second AI engine capable of learning to emulate the at least one internal control subsystem by receiving the at least one test input from the knowledge base;
learning to predict at least one second normal behavior associated with the at least one internal control subsystem by observing at least one second test behavior generated by the at least one internal control subsystem in response to the at least one test input;
and
storing one or more of the at least one test input and the associated second normal behavior to the knowledge base;
the at least one second AI engine couplable to the at least one internal control subsystem and configured to:
receive the at least one control input;
observe at least one second control behavior generated by the at least one internal control subsystem in response to the at least one control input;
determine the at least one stored test input corresponding to the at least one control input;
and
detect at least one second cyberintrusion fault associated with the at least one internal control subsystem by comparing the at least one observed second control behavior to the at least one stored second normal behavior associated with the at least one determined test input.

13. A method for independent and dissimilar cybersecurity monitoring of critical control systems (CCS), the method comprising:
training at least one artificial intelligence (AI) engine incorporating one or more first processors to emulate at least one CCS incorporating one or more second processors dissimilar to the one or more first processors based on at least one of a test input and an input vector including at least one of a control input associated with the at least one CCS and a control output corresponding to the control input;
connecting the at least one trained AI engine to the at least one CCS;
receiving, via the at least one AI engine, at least one control input received by the at least one CCS;
and
detecting, via the at least one AI engine, at least one cyberintrusion fault associated with the at least one CCS based on the at least one received control input.

14. The method of claim 13, wherein training at least one artificial intelligence (AI) engine incorporating one or more first processors to emulate at least one CCS incorporating one or more second processors dissimilar to the one or more first processors based on at least one of a test input and an input vector including at least one of a control input associated with the at least one CCS and a control output corresponding to the control input includes:
training the at least one AI engine to predict one or more test outputs associated with at least one of the test input and the input vector, the one or more test outputs corresponding to the one or more control outputs.

15. The method of claim 13, wherein training at least one artificial intelligence (AI) engine incorporating one or more first processors to emulate at least one CCS incorporating one or more second processors dissimilar to the one or more first processors based on at least one of a test input and an input vector including at least one of a control input associated with the at least one CCS and a control output corresponding to the control input includes:
training the at least one AI engine to generate one or more test outputs associated with the at least one test input, the one or more test outputs corresponding to the at least one control output.

16. The method of claim 15, wherein the at least one control output is a first control output and detecting, via the at least one AI engine, at least one cyberintrusion fault associated with the at least one CCS based on the at least one received control input includes:
detecting, via the at least one AI engine, at least one cyberintrusion fault associated with the at least one CCS by comparing the one or more test outputs to at least one second control output generated by the at least one CCS in response to the at least one received control input.

17. The method of claim 13, wherein training at least one artificial intelligence (AI) engine incorporating one or more first processors to emulate at least one CCS incorporating one or more second processors dissimilar to the one or more first processors based on at least one of a test input and an input vector including at least one of a control input associated with the at least one CCS and a control output corresponding to the control input includes:
training the at least one AI engine to predict at least one normal behavior associated with the at least one CCS by observing at least one test behavior associated with the at least one CCS, the at least one test behavior generated by the at least one CCS in response to the at least one test input; and storing one or more of the at least one test input and the associated normal behavior to the knowledge base.

18. The method of claim 17, further comprising:

observing, via the at least one AI engine, one or more control behaviors associated with the at least one CCS in response to the at least one received control input; and determining, via the at least one AI engine, the at least one stored test input corresponding to the at least one received control input.

19. The method of claim 18, wherein detecting, via the at least one AI engine, at least one cyberintrusion fault associated with the at least one CCS based on the at least one received control input includes:

detecting, via the at least one AI engine, at least one cyberintrusion fault associated with the at least one CCS by comparing the one or more observed control behaviors to the one or more stored normal behaviors associated with the at least one determined test input.

20. The method of claim 13, wherein the at least one critical control system is a system of systems comprising at least one of an internal control subsystem and an external control subsystem, and detecting, via the at least one AI engine, at least one cyberintrusion fault associated with the at least one CCS based on the at least one received control input includes:

detecting, via at least one AI engine, at least one of an internal cyberintrusion fault associated with the at least one internal control subsystem and an external cyberintrusion fault associated with the at least one external control subsystem based on the at least one received control input.

* * * * *